United States Patent
Gonzalez Aguirre et al.

(10) Patent No.: US 11,093,530 B2
(45) Date of Patent: Aug. 17, 2021

(54) TECHNOLOGIES FOR MANAGEMENT OF DATA LAYERS IN A HETEROGENEOUS GEOGRAPHIC INFORMATION SYSTEM MAP

(71) Applicant: Intel Corporation, Santa Clara, CA (US)

(72) Inventors: David Israel Gonzalez Aguirre, Hillsboro, OR (US); Javier Felip Leon, Hillsboro, OR (US); Maria Soledad Elli, Hillsboro, OR (US); Luis Carlos Maria Remis, Hillsboro, OR (US); Javier Sebastian Turek, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 136 days.

(21) Appl. No.: 16/457,167

(22) Filed: Jun. 28, 2019

(65) Prior Publication Data

US 2019/0324977 A1  Oct. 24, 2019

(51) Int. Cl.
*G06F 16/29* (2019.01)
*G06F 16/22* (2019.01)
*G06F 16/21* (2019.01)

(52) U.S. Cl.
CPC ............ *G06F 16/29* (2019.01); *G06F 16/211* (2019.01); *G06F 16/2219* (2019.01)

(58) Field of Classification Search
CPC ...................................................... G06F 16/29
See application file for complete search history.

(56) References Cited

U.S. PATENT DOCUMENTS

| | | | | |
|---|---|---|---|---|
| 8,199,156 B2* | 6/2012 | Antoine | ................ | G06F 3/1454 345/502 |
| 2009/0251472 A1* | 10/2009 | Antoine | ................ | G06T 13/80 345/502 |
| 2013/0088492 A1* | 4/2013 | Jagadev | ................ | G06T 3/40 345/428 |
| 2017/0039242 A1* | 2/2017 | Milton | ................ | G06Q 30/0269 |

OTHER PUBLICATIONS

Zheng, Linjiang, et al. "The spatio-temporal data modeling and application based on graph database." 2017 4th International Conference on Information Science and Control Engineering (ICISCE). IEEE, 2017. (Year: 2017).*

(Continued)

*Primary Examiner* — William Spieler
(74) *Attorney, Agent, or Firm* — Alliance IP, LLC

(57) ABSTRACT

Technologies for management of data layers in a heterogeneous geographic information system (GIS) map are disclosed. A compute device may maintain a GIS database that includes geo-quads that represent physical locations of various scales. Data layers and layer tracks may be dynamically added to the GIS database at different scales, allowing for an extensible framework that enables a mechanism for integrating additional functionality. In the illustrative embodiment, a graph database is used to store the GIS database, allowing for a flexible structure. In some embodiments, entries in layer tracks may include binary large objects that may have properties and associated methods, allowing for application-specific functionality.

25 Claims, 7 Drawing Sheets

(56) References Cited

OTHER PUBLICATIONS

QuadTiles, https://wiki.openstreetmap.org/wiki/QuadTiles, retrieved on Jun. 25, 2019.
GeoHash Tips & Tricks, http://geohash.org/site/tips.html, retrieved on Jun. 25, 2019.
Shimada et al., "Implementation and Evaluation of Local Dynamic Map in Safety Driving Systems," Journal of Transportation Technologies, 5, 102-112 (2015).

* cited by examiner

TECHNOLOGIES FOR MANAGEMENT OF DATA LAYERS IN A HETEROGENEOUS GEOGRAPHIC INFORMATION SYSTEM MAP

BACKGROUND

Representation of the real world in a digital form requires integration of abstract data from multiple sources with representations of the physical world such as maps. Systems that represent this information associated with a particular area are geographic information systems (GISs). Current systems may explicitly define a large number of layers that can be represented on a map and that are suitable for a specific implementation. However, current systems have limitations that make them unsuitable for providing a more general and extensible approach.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
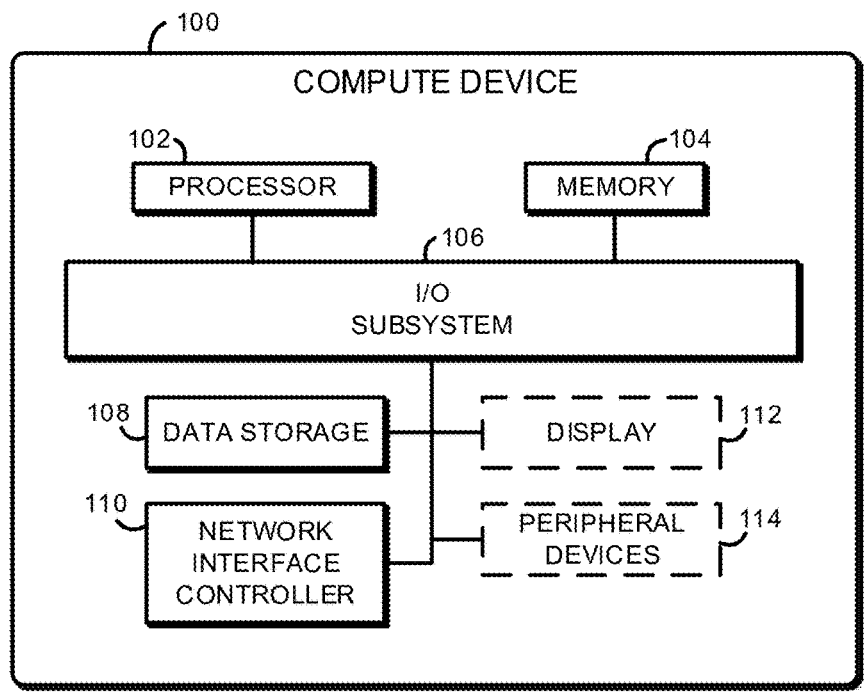
FIG. 1 is a simplified block diagram of at least one embodiment of a compute device for management of data layers in heterogeneous maps.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative compute device 100 is configured to manage a geographic information system (GIS) database that stores data layers and corresponding layer entries across a heterogeneous range of sizes. In the illustrative embodiment, a map of the world can be split up into geo-quads that are defined by approximately rectangular parcels of land, as explained in further detail below. As used herein, a geo-quad refers to an object or representation in a database that represents a particular region. The size of the geo-quads can range from thousands of kilometers on a side to less than a meter on a side. Layers can be dynamically added to the GIS database, allowing for layers that are specific to a particular time, location, application, etc. In the illustrative embodiment, some or all of the GIS database may be stored using a graph database, allowing for efficient traversal of the GIS database during queries and dynamic configuration of relations between data elements.

It should be appreciated that the illustrative embodiment described herein allows for a forward-compatible architecture that will allow for future applications, use cases, and information to be integrated into the GIS database. The spatial indexing with a heterogeneous resolution and temporally-defined data elements allows for a flexible and dynamic representation of a wide variety of information. In some embodiments, unrelated systems may access and share information, allowing, e.g., automated vehicles, drones, and service robots to operate on the same set of information in a coordinated fashion.

The compute device 100 may be embodied as any type of compute device capable of managing a GIS database and performing the functions described herein. For example, the compute device 100 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, and/or any other computing device. The illustrative compute device 100 includes the processor 102, a memory 104, an input/output (I/O) subsystem 106, data storage 108, and a network interface controller 110. In some embodiments, one or more of the illustrative components of the compute device 100 may be incorporated in, or otherwise form a portion of, another component. For example, the memory 104, or portions thereof, may be incorporated in the processor 102 in some embodiments.

The processor 102 may be embodied as any type of processor capable of performing the functions described herein. For example, the processor 102 may be embodied as a single or multi-core processor(s), a single or multi-socket processor, a digital signal processor, a graphics processor, a microcontroller, or other processor or processing/controlling circuit. Similarly, the memory 104 may be embodied as any type of volatile or non-volatile memory or data storage capable of performing the functions described herein. In operation, the memory 104 may store various data and software used during operation of the compute device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the compute device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 102, the memory 104, and other components of the compute device 100 on a single integrated circuit chip.

The data storage 108 may be embodied as any type of device or devices configured for the short-term or long-term storage of data. For example, the data storage 108 may include any one or more memory devices and circuits, memory cards, hard disk drives, solid-state drives, or other data storage devices.

The network interface controller 110 may be embodied as any type of interface capable of interfacing the compute device 100 with other compute devices, such as over a network. In some embodiments, the network interface controller 110 may be referred to as a host fabric interface (HFI). The network interface controller 110 may be capable of interfacing with any appropriate cable type, such as an electrical cable or an optical cable, and/or may be capable of interfacing with a wireless signal, such as through one or more antennae. The network interface controller 110 may be configured to use any one or more communication technology and associated protocols (e.g., Ethernet, Bluetooth®, WiMAX, near field communication (NFC), etc.). The network interface controller 110 may be located on silicon separate from the processor 102, or the network interface controller 110 may be included in a multi-chip package with the processor 102, or even on the same die as the processor 102. The network interface controller 110 may be embodied as one or more add-in-boards, daughtercards, network interface cards, controller chips, chipsets, specialized components such as a field programmable gate array (FPGA) or application specific integrated circuit (ASIC), or other devices that may be used by the compute device 100 to connect with another compute device. In some embodiments, network interface controller 110 may be embodied as part of a system-on-a-chip (SoC) that includes one or more processors, or included on a multichip package that also contains one or more processors.

In some embodiments, the compute device 100 may include other or additional components, such as those commonly found in a compute device. For example, the compute device 100 may also have a display 112 and/or peripheral devices 114. The peripheral devices 114 may include a keyboard, a mouse, etc. The display 112 may be embodied as any type of display on which information may be displayed to a user of the compute device 100, such as a touchscreen display, a liquid crystal display (LCD), a light emitting diode (LED) display, a cathode ray tube (CRT) display, a plasma display, an image projector (e.g., 2D or 3D), a laser projector, a heads-up display, and/or other display technology.

Figure 2:
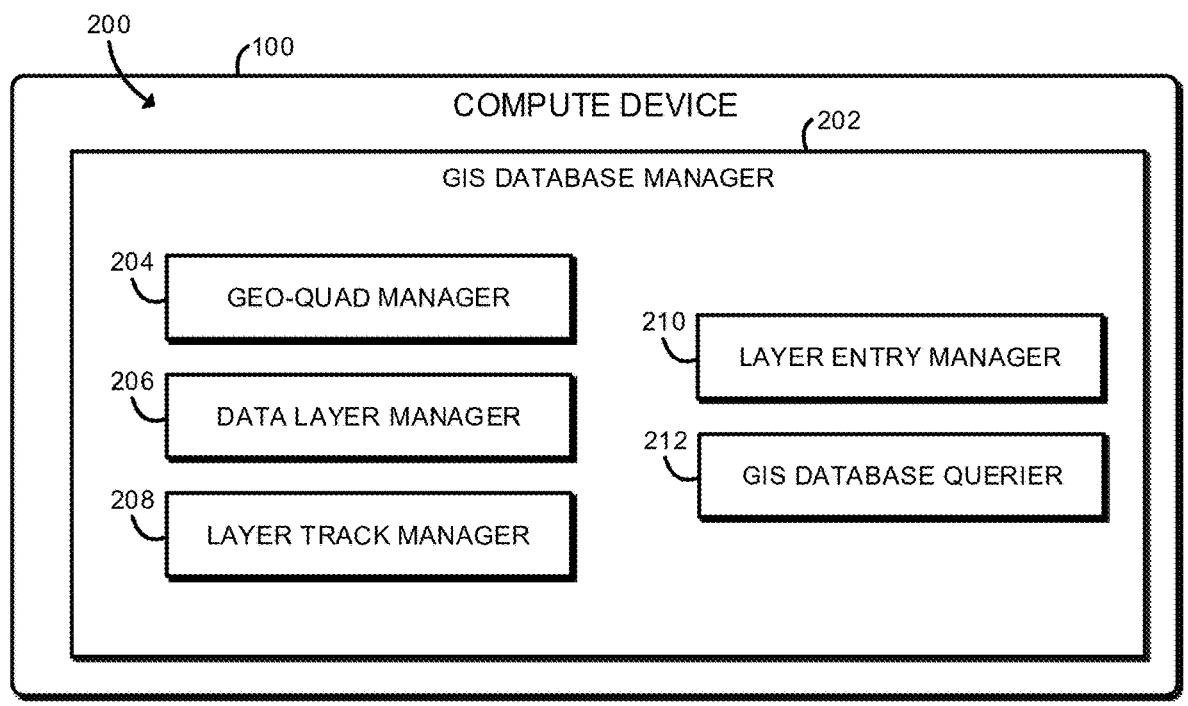
FIG. 2 is a block diagram of at least one embodiment of an environment that may be established by the compute device of FIG. 1.

Referring now to FIG. 2, in an illustrative embodiment, the compute device 100 establishes an environment 200 during operation. The illustrative environment 200 includes a GIS database manager 202. The various modules of the environment 200 may be embodied as hardware, software, firmware, or a combination thereof. For example, the various modules, logic, and other components of the environment 200 may form a portion of, or otherwise be established by, the processor 102, memory 104, or other hardware components of the compute device 100. As such, in some embodiments, one or more of the modules of the environment 200 may be embodied as circuitry or collection of electrical devices (e.g., GIS database manager circuitry, etc.). It should be appreciated that, in such embodiments, one or more of the circuits (e.g., the GIS database manager circuitry 202, etc.) may form a portion of one or more of the processor 102, the memory 104, the I/O subsystem 106, the network interface controller 110, the data storage 112, and/or other components of the compute device 100. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 102 or other components of the compute device 100.

The GIS database manager 202, which may be embodied as hardware, firmware, software, virtualized hardware, emulated architecture, and/or a combination thereof as discussed above, is configured to manage a GIS database the stores information associated with one or more layers and one or more maps. In some embodiments, the information of the GIS database manager 202 may be stored in a distributed network of one or more compute devices. For example, in some embodiments, information related to a particular geo-quad and descendant geo-quads may be stored in the geographic region represented by the geo-quad. The illustrative GIS database manger 202 includes a geo-quad manager 204, a data layer manager 206, a layer tracker manager 208, a layer entry manager 210, and a GIS database querier 212.

Figure 3:
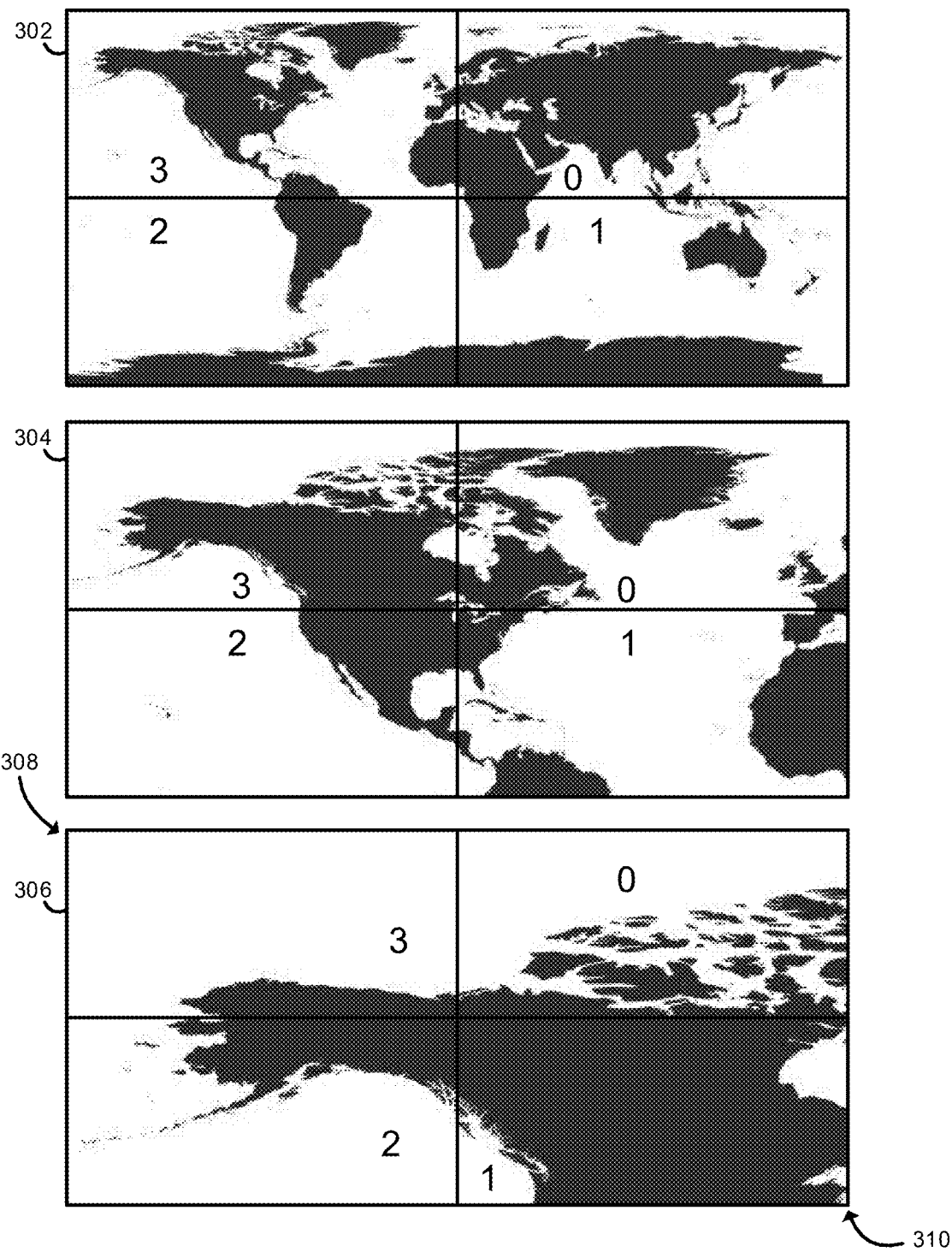
FIG. 3 is a simplified map showing a geo-quad approach to indexing locations.

The geo-quad manager 204 is configured to manage geo-quad entries in one or more databases. Several geo-quads from an illustrative embodiment are shown in FIG. 3. In the illustrative embodiment, the full extent of a map, such as a Mercator projection map of Earth, may be geo-quad 302 that is a root node entry, representing the entire map. The root geo-quad 302 can be split up into four smaller geo-quads, labeled "0," "1," "2," and "3." Each geo-quad can recursively be split into smaller and smaller geo-quads, allowing for a range of geo-quad sizes. For example, the smaller geo-quad labeled "3" in the root geo-quad 302 is shown as geo-quad 304, which can, in turn, be split into four smaller geo-quads labeled "0," "1," "2," and "3." The smaller geo-quad labeled "3" in geo-quad 304 then leads to geo-quad 306, and so on.

Each geo-quad can be specified by a series of two-bit selections indicating how to arrive at the geo-quad in question from the root geo-quad 302. For example, to get from the root geo-quad 302 to the geo-quad 306, the selection would be "3" and "3," represented in binary as "1111." The geo-quad labeled "1" in geo-quad 306 would be represented as "3," "3," and "1," or "111101," and so on.

Figure 4:
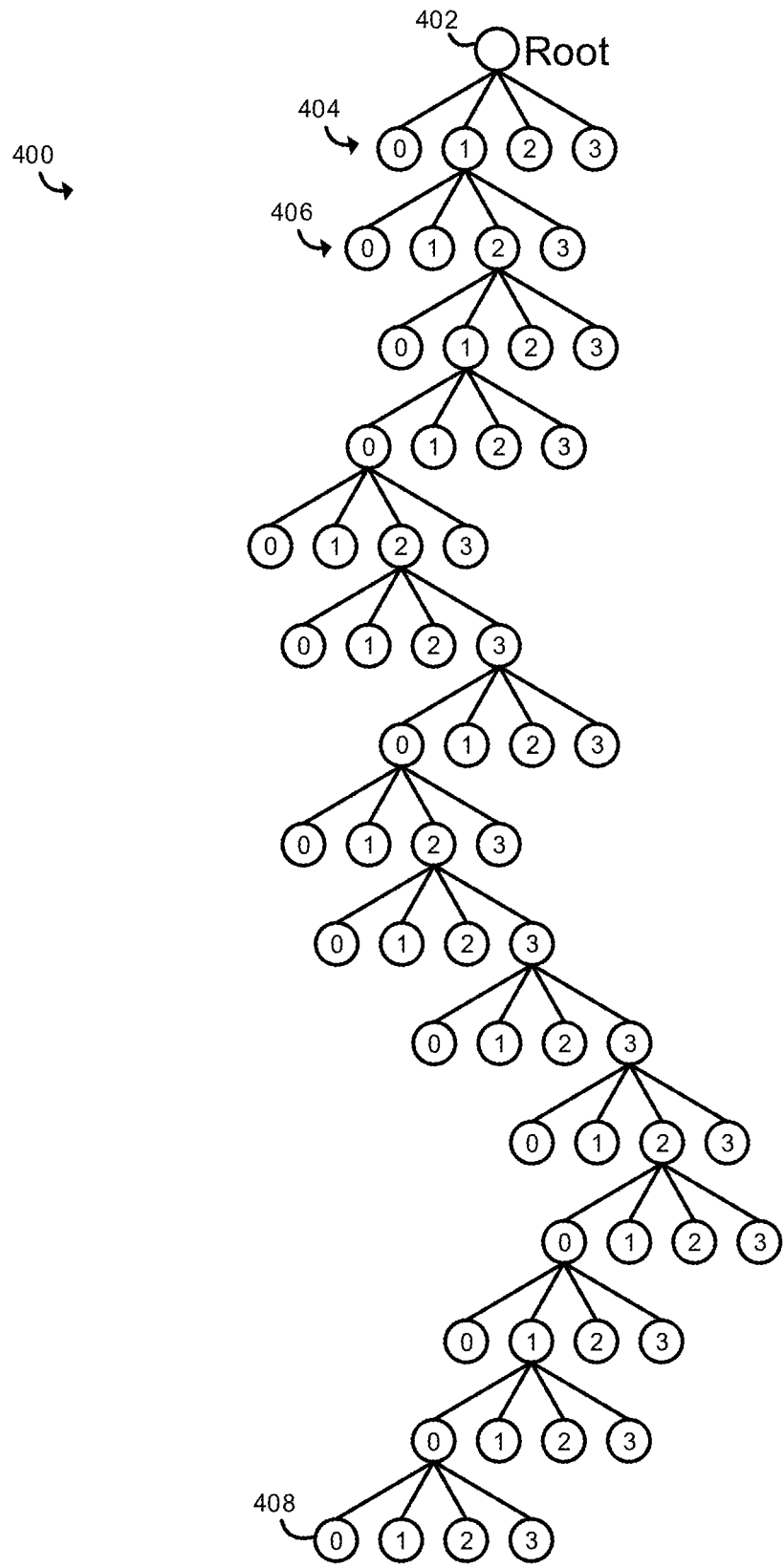
FIG. 4 is a simplified block diagram showing how a geo-quad can be selected.

As shown in FIG. 4, a geo-quad may be selected by progressing from the root node 402, though a first layer 404, and second layer 406, etc., until arriving at a target geo-quad. The geo-quad 408 could be represented as "121023023320100," or, in binary, "01100100101100101111000010000." In the illustrative embodiment, geo-quads may be represented using, e.g., an index up to 64 bits. It should be appreciated that, in the illustrative embodiment, larger geo-quads may be represented with fewer bits as compared to smaller geo-quads, and that the compute device 100 will be able to represent indices of geo-quads of different lengths.

Referring back to the geo-quad manager 204 in FIG. 2, the geo-quad manager 204 may allow geo-quads to be represented in any suitable manner. As described above, the illustrative geo-quads may be represented as rectangles of a two-dimensional projection of some or all of Earth onto a map. Additionally or alternatively, in some embodiments, the geo-quads may divide up an area using angular coordinates such as longitude and latitude and/or may divide up an area into different shapes, such as triangles, hexagons, etc. In some embodiments, different geo-quads at the same or different level may have different shapes. It should be appreciated that map projections other than a Mercator projection may be used in some embodiments, or, additionally or alternatively, no projection onto a two-dimensional surface may be done at all.

Each geo-quad entry in the illustrative GIS database includes an index and coordinates defining an area of the geo-quad. The coordinates may be, e.g., a latitude and longitude of a top-left corner and a bottom-right corner of the geo-quad, such as longitude and latitude of corner 308 and 310 shown in FIG. 3. Additionally or alternatively, the coordinates may be linear coordinates of a top-left corner and a bottom-right corner on a two-dimensional map. It should be appreciated that, in various embodiments, and suitable coordinates may be used to indicate the extent of the geo-quad.

A geo-quad entry may also include an index of its parent geo-quad and four children geo-quads. Of course, the root node will not have a parent geo-quad and, in some embodiments, the lowest-level geo-quad leaf nodes cannot have children geo-quads. It should be appreciated that, in the illustrative embodiment, not every possible geo-quad will have an entry. Rather, geo-quad entries can be created at different levels of granularity as needed. For example, geo-quads may exist on a meter scale in London in order to track, e.g., traffic patterns at a fine-grained level, but a geo-quads in the middle of the Pacific Ocean may only exist at a scale of 100 kilometers. In some embodiments, geo-quad objects may not be created unless or until necessary for an associated data layer to be created.

In some embodiments, geo-quad entries may have additional properties, such as an elevation, which may be an average elevation of the geo-quad. A geo-quad entry may be marked as disabled, which may be used for geo-quads that correspond to sensitive locations such as military bases. Information associated with a disabled geo-quad may be inaccessible or not stored at all.

The data layer manager 206 is configured to manage data layer entries in the GIS database. The data layer entries may include an index, a reference to a corresponding geo-quad, and a description of the content type. The content type may be, for example, real estate information, road information, school information, train schedules, bus schedules, taxi or ride-sharing vehicle location, etc.

The layer track manager 208 is configured to manage layer track entries in the GIS database. Each layer track entry may include an index, a reference to a corresponding data layer, a description, a creation time, and a time of a most recent entry. The layer tracks may be any suitable categorization of information. For example, for a real estate data layer, there may be a layer track for recent sales, a layer track for current listings, a layer track for projected price, etc. For a road information data layer, there may be a layer track for traffic, a layer track for construction, a layer track for speed traps, etc.

The layer entry manager 210 is configured to manage layer entries in the GIS database. Each layer entry may include an index, a reference to a corresponding layer track, and one or more timestamps, which may indicate a starting time and/or an ending time. Each illustrative layer entry includes an entity information element, such as a physical entity information element, a virtual entity information element, or a binary large object (or "blob"). A physical entity information element may indicate, e.g., a size, position, or location, a class identifier, and a visualization and/or description. A virtual entity information element may include similar information as the physical entity information element, but may not necessarily include, e.g., a size, position, or location.

A blob entry may include an application-specific extensible object. The blob may be an object that is used for a particular application and may be stored in a similar manner as an object in an object-oriented database. The blob may be an object that has properties, attributes, and associated methods or functions. The blob may include an indication of where additional information or functionality is available, such as a remote server. An object may have associated methods to determine, e.g., a bounding box, appurtenance, class identification, etc. For example, a layer entry indicating construction work may show a start time, an end time, a bounding box, whether or not all traffic will be blocked, etc. In some embodiments, the blob may include security information, such as an indication of what users are permitted, how access can be granted, a remote authentication server, etc.

It should be appreciated that, in some embodiments, the start time of a data entry may be in the future. Such an approach would allow representation of events or occurrences that will occur in the future, such as train arrival time, future road construction, event information to be available prior to the actual even occurring, etc. In some embodiments, there may be no associated end time or the end time may not yet be determined. In such embodiments, the end time may be left blank or null.

The GIS database querier 212 is configured to receive queries from users or administrators and perform the queries on the GIS database. A query may search for results based on, e.g., a particular location (e.g., latitude and longitude), a particular geo-quad, a particular data layer or layer track, etc. The GIS database querier 212 may be configured to traverse a graph data structure as part of performing the query. The GIS database querier 212 may, for example, traverse all data layers and layer entries associated with a particular geo-quad or may traverse layers associated with nearby geo-quads, such as geo-quads that share a parent or grandparent.

In addition to the functionality described above, the GIS database manager 202 may implement access control in various ways. For example, users may register with an application, and then may be able to view some or all of the data layers, layer tracks, and/or layer entries associated with the application after logging in and authenticating with the application. Some information may be marked as private and only accessible to the user that generated it, such as location information of the user.

In the illustrative embodiment, the GIS database of the GIS database manager 202 may be at least partially implemented as a graph database. Data that is more likely to be queried based on connections between multiple objects may be represented as a graph. For example, a graph database may have a layer entry, and there may be an indication stored that there is a relationship between a particular layer entry and a particular layer track, and there may be an indication stored that there is a relationship between the layer track and a particular data layer, etc. It should be appreciated that the graph database approach allows for a more flexible, dynamic database that can be added to, modified, and queried without the explicit structure required in a relational database. Additionally or alternatively, the GIS database may be implemented partially or completely using a relational database. A relational database may be better suited to represent certain data that is more transactional-oriented or may be subject to regular batch updates, such as weather information. Any given data layer and/or layer track and related entries may be stored in the format of a graph database, a relational database, or both.

Figure 5:
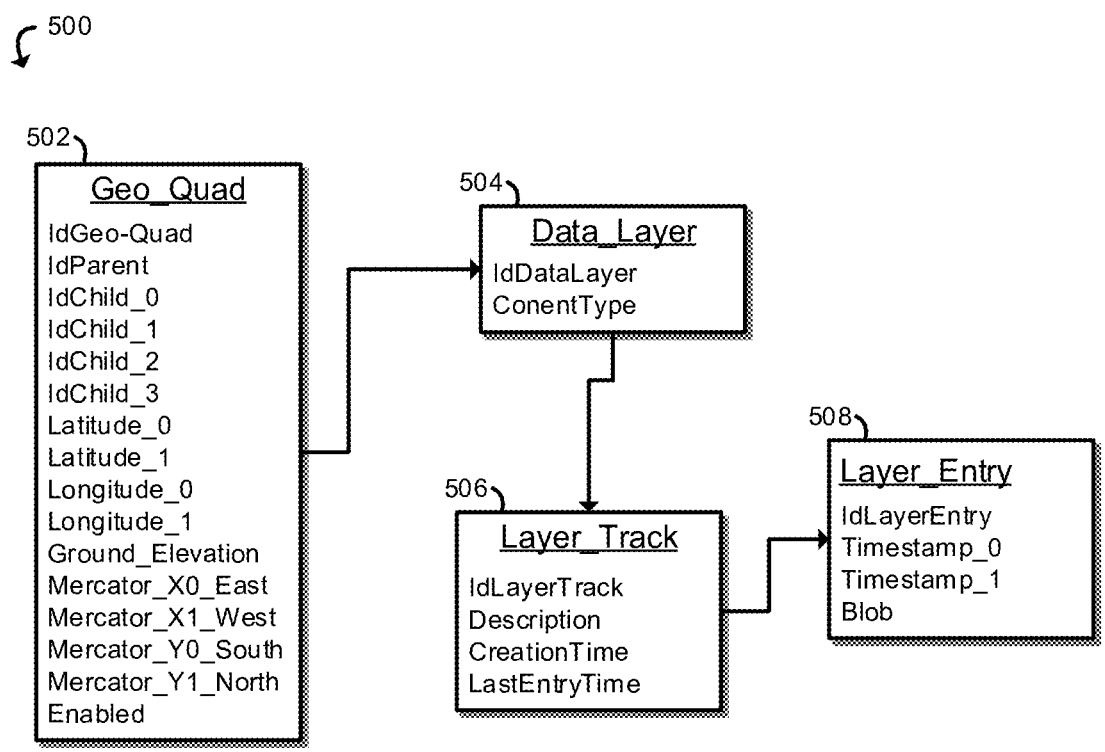
FIG. 5 is a simplified block diagram of at least one embodiment of a GIS database structure that may be managed by the compute device of FIG. 1.

Referring now to FIG. 5, an illustrative GIS database 500 is shown. The GIS database 500 includes a geo-quad entry 502, a data layer 504, a layer track 506, and a layer entry 508, each of which includes several properties, as discussed above in more detail. In a graph database embodiment, a relationship is established between the various entries, shown by arrows in FIG. 5. In relational database embodiments, the relationships between the various entries may be established by foreign keys linking the entries.

Figure 6:
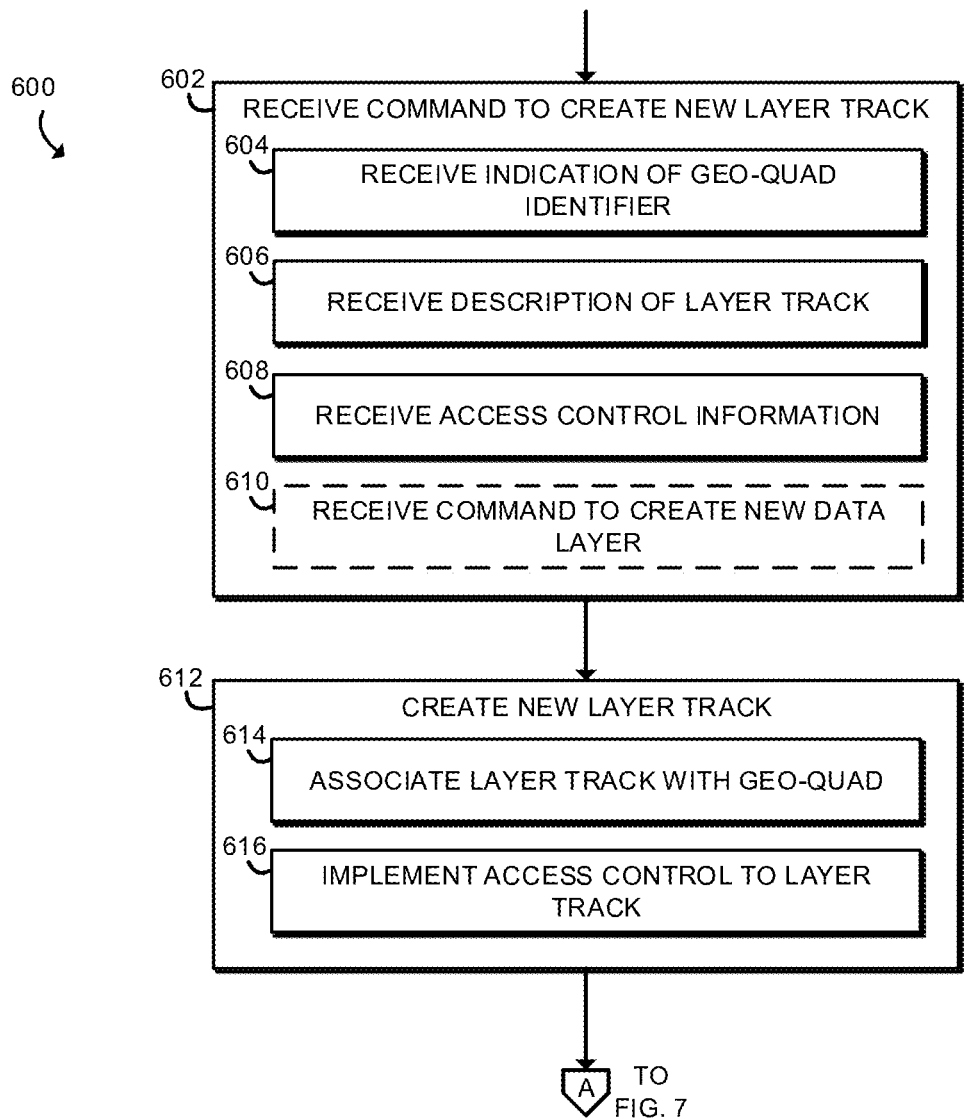
FIGS. 6 & 7 are simplified flow diagrams of at least one embodiment of a method for managing data layers in heterogeneous maps that may be performed by the compute device of FIG. 1.

Referring now to FIG. 6, in use, the compute device 100 may execute a method 600 for creating a new layer track and corresponding entries in a GIS database. In block 602, the compute device 100 receives a command to create a new layer track. The compute device 100 may receive the command from any suitable source, such as a user compute device (e.g., a cell phone), an administrator of the compute device 100, an automated vehicle, a remote server, a local server, a third-party server, etc. It should be appreciated that, in some embodiments, commands to create one or more new layer tracks or new data layers may be sent by a third party to build on to the database, such as a third-party developer with no other relation to the administrator of the compute device 100 or the GIS database. The compute device 100 may receive part of the command that indicates a geo-quad identifier in block 604. In the illustrative embodiment, the compute device 100 may receive an indication of a data layer, and the data layer may indicate an associated geo-quad. Additionally or alternatively, in some embodiments, the compute device 100 may, e.g., receive an index of a geo-quad, a latitude and longitude, coordinates of a Universal Transverse Mercator coordinate system or similar coordinate system, etc. The compute device 100 may receive a description of the layer track in block 606. The description of the layer track may be any suitable description, such as traffic information, real estate value, upcoming events, etc. In block 608, the compute device 100 may receive access control information. The access control information may include, e.g., a list of authorized users, a password, an indication of acceptable credentials, etc. The access control information may also include a list of permissions, such as what users or user levels are permitted to read, write, modify, delete, execute, etc., certain information. In some embodiments, the compute device 100 may receive a command to create a new layer track that is associated with an existing data layer. Additionally or alternatively, the compute device 100 may also receive a command to create a new data layer in block 610, either as part of the command to create a new layer track or as a separate command In some embodiments, the command to create a new data layer may indicate whether the data layer and associated layer tracks and layer entries should be stored as a graph database or a table-based relational database.

In block 612, the compute device 100 may create the layer track based on the information received in block 602. The compute device 100 may associate the layer track with a geo-quad in block 614, such as by associating the layer track with another entry in the GIS database such as a data layer that is itself associated with a geo-quad or by directly associating the layer track with the geo-quad. The compute device 100 may implement access control on the layer track in block 616, such as by saving the access control information for future access.

Figure 7:
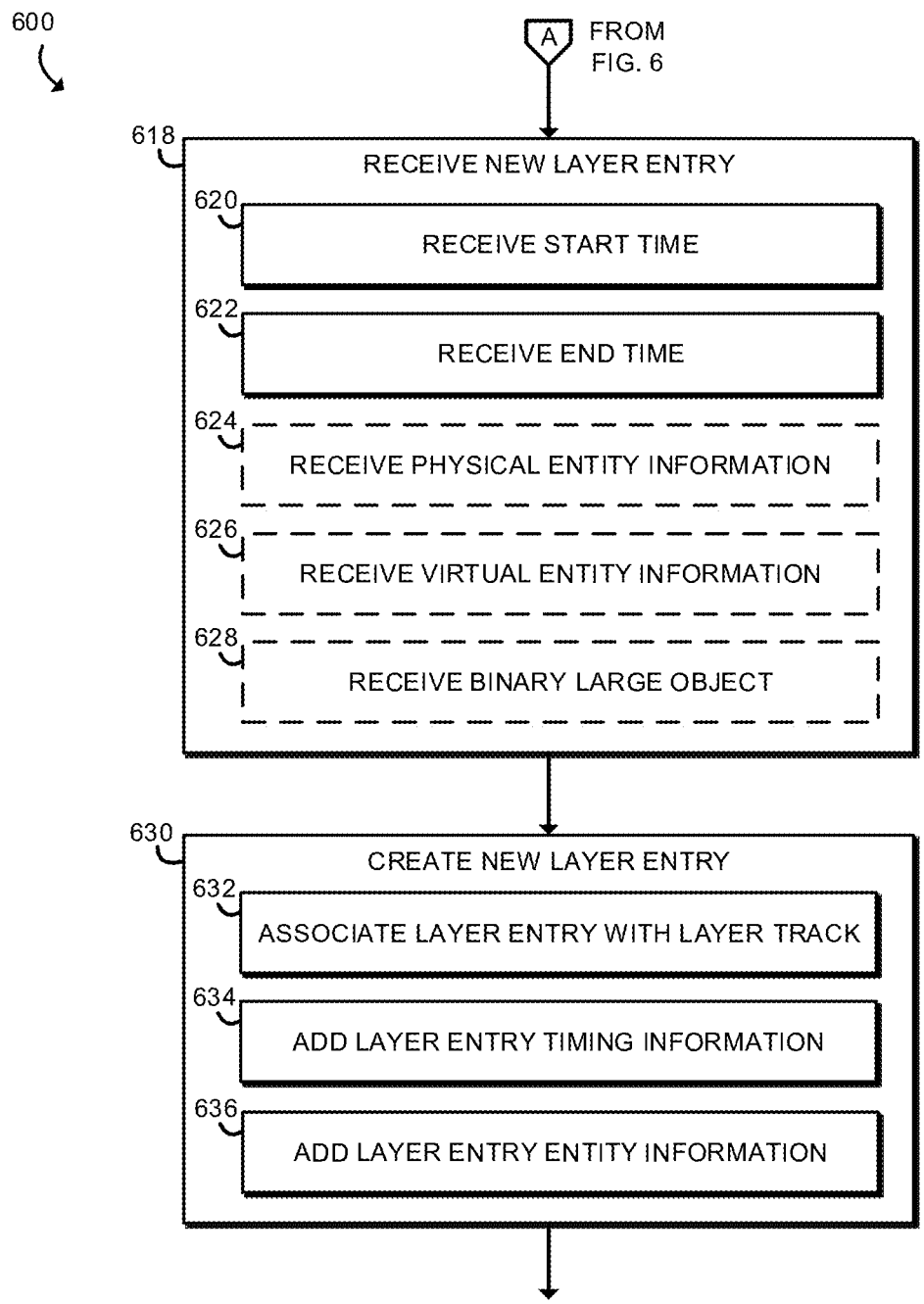

Referring now to FIG. 7, the method 600 proceeds to block 618, in which the compute device 100 receives a new layer entry. The layer entry includes an indication of an associated layer track, such as the layer track created in block 612. The compute device 100 may receive a start time for the layer entry in block 620. It should be appreciated that, in some embodiments, the start time may be in the future. Such an approach would allow for detours for road construction to be planned, for event information to be available prior to the actual even occurring, etc. The compute device 100 may receive an end time for the layer entry in block 622. In some embodiments, there may be no associated end time or the end time may not yet be determined. In such embodiments, the end time may be left blank or null.

The compute device 100 may also receive at least one of physical entity information in block 624, virtual entity information in block 626, or a binary large object ("blob") in block 628. Physical entity information may indicate, e.g., a size, position, or location of the layer entry, a class identifier of the layer entry, and a visualization and/or description of the layer entry. Virtual entity information may include similar information as the physical entity information, but may not necessarily include, e.g., a size, position, or location.

A blob may include an application-specific extensible object. The blob may be an object that is used for a particular application. The blob may be an object that has properties, attributes, and associated methods or functions. The blob may include an indication of where additional information or functionality is available, such as a remote server. An object may have associated methods to determine, e.g., a bounding box, appurtenance, class identification, etc. For example, a layer entry indicating construction work may show a start time, an end time, a bounding box, whether or not all traffic will be blocked, etc. In some embodiments, the blob may include security information, such as an indication of what users are permitted, how access can be granted, a remote authentication server, etc.

In block 630, the compute device 100 may create the new layer entry. The compute device 100 may associate the layer entry with a particular layer track in block 632. The compute device 100 may add layer entry timing information in block 634, including an indication of a future start time when appropriate. The compute device 100 may also add layer entry entity information in block 636, such as physical entity information, virtual entity information, and blob information.

It should be appreciated that, in addition to receiving new data layers, layer tracks, and layer entries, the compute device 100 may receive other operations to modify data in the GIS database, such as deletion operations, update operations, etc. For example, in some embodiments, compute devices on cars may update entries associated with a layer track of traffic as the compute devices sense traffic in real time.

Figure 8:
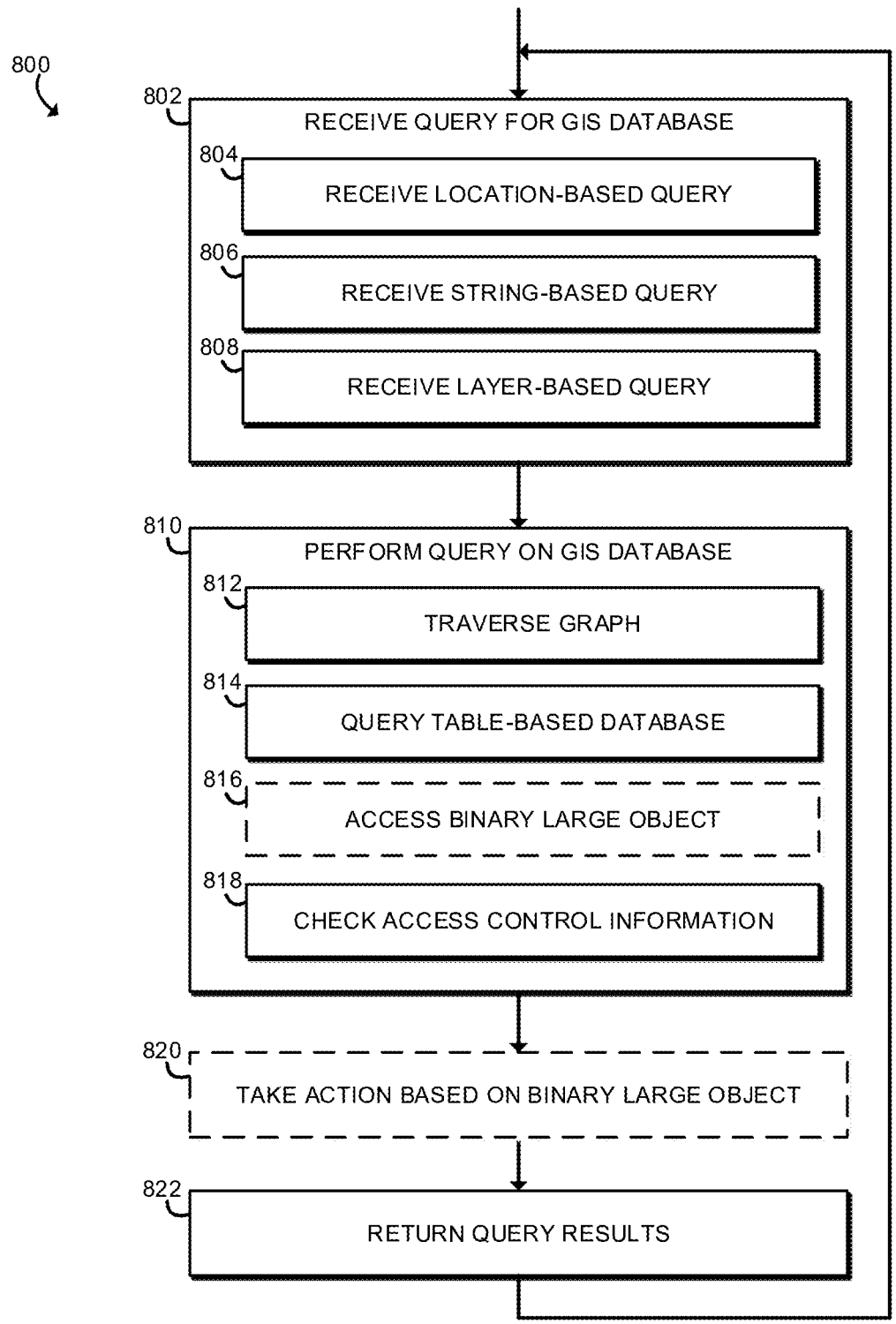
FIG. 8 is a simplified flow diagram of at least one embodiment of a method for querying a GIS database that may be performed by the compute device of FIG. 1.

Referring now to FIG. 8, in use, the compute device 100 may execute a method 800 for handling queries to a GIS database. The method 800 begins in block 802, in which the compute device 100 receives a query for a GIS database. The compute device 100 may receive the query from any suitable source, such as a user compute device (e.g., a cell phone), an administrator of the compute device 100, an automated vehicle, a remote server, a local server, a third-party server, a sensor, etc. The query may be any suitable query for retrieving information from the GIS database. For example, the compute device 100 may receive a location-based query in block 804. The query may be based on a particular location, such as retrieve all data layers associated with a particular latitude and longitude. The compute device 100 may also receive a string-based query in block 806, such as retrieve all layer tracks or data layers matching a string "traffic." The compute device 100 may also receive a layer-based query in block 808, such as retrieve all layer entries associated with a particular layer. Of course, in some embodiments, a query may include two or more of a location indicator, string indicator, and layer indicator. For example, a query may ask for all layer tracks in a particular geo-quad matching the string "traffic," along with all of the associated layer entries where the current time is between an end time and start time.

In block 810, the compute device 100 performs the query on the GIS database. In the illustrative embodiment, the query is related to data that is stored in a graph database, and the compute device 100 will perform the query by traversing part of a graph that represents the GIS database in block 812. For example, if a query asks for all layer entries associated with a layer track matching the string "traffic," the compute device 100 may first locate one or more layer tracks matching the string "traffic," and then traverse all links to layer entries that are linked by an edge to the matching layer tracks. Additionally or alternatively, in some embodiments, the compute device 100 may query a table-based relational database in block 814. It should be noted that, in some embodiments, a query for a graph database may be faster than a query of a relational database if, e.g., the query of the relational database would require multiple join operations.

As part of performing the query, in some embodiments, the compute device 100 may access a blob in block 816. In block 818, the compute device 100 may check access control information for determining whether the query should be permitting. The compute device 100 may, e.g., check a username associated with the query against a list of permitted usernames.

In some embodiments, the compute device 100 may simply retrieve the blob for transfer to the requesting device. Additionally or alternatively, the compute device 100 may in block 820 analyze the blob, parse data in the blob, and take some further action, such as retrieving information from a remote server.

In block 822, the compute device 100 returns the query results to the requesting compute device. The method 800 may then loop back to block 802, where the compute device 100 waits for an additional query.

EXAMPLES

Illustrative examples of the devices, systems, and methods disclosed herein are provided below. An embodiment of the devices, systems, and methods may include any one or more, and any combination of, the examples described below.

Example 1 includes a compute device for managing a geographic information system (GIS) database, the compute device comprising a processor; a memory; and GIS database manager circuitry to receive a command to create a layer track associated with a geo-quad of a plurality of geo-quads of the GIS database, wherein the plurality of geo-quads include geo-quads with each of a plurality of different sizes; create the layer track in the GIS database; and associate the layer track with the geo-quad of the plurality of geo-quads.

Example 2 includes the subject matter of Example 1, and wherein the GIS database manager circuitry is further to receive a command to create a layer entry associated with the layer track, wherein the command to create the layer entry includes a data object and a start time that is in the future; create the layer entry in the GIS database including the data object and the start time that is in the future; and associate the layer entry with the layer track.

Example 3 includes the subject matter of any of Examples 1 and 2, and wherein the command to create the layer track is a command to create the layer track as a graph database object, wherein to create the layer track in the GIS database comprises to create the layer track in the GIS database as the graph database object, wherein to associate the layer track with the geo-quad comprises to create an edge between the layer track and the geo-quad, wherein the GIS database manager circuitry is further to receive a second command to create a second layer track associated with the geo-quad as a relational database object; and create the second layer track as the relational database object with an indication of the geo-quad of the plurality of geo-quads stored in the second layer track as a foreign key.

Example 4 includes the subject matter of any of Examples 1-3, and wherein the GIS database manager circuitry is further to receive a first query of the layer track; receive a second query of the second layer track; traverse the layer track as a graph in response to receipt of the first query; and perform one or more join operations on the second layer track in response to receipt of the second query.

Example 5 includes the subject matter of any of Examples 1-4, and wherein the GIS database manager circuitry is further to receive, from a third party unrelated to an administrator of the GIS database, a command to create a new data layer of the GIS database for use in a new application; and create, in response to receipt of the command to create the new data layer, the new data layer of the GIS database for use in the new application.

Example 6 includes the subject matter of any of Examples 1-5, and wherein the GIS database manager circuitry is further to receive a command to create a layer entry associated with the layer track, wherein the command to create the layer entry includes a binary large object, wherein the binary large object provides an indication of one or more methods associated with the binary large object; create the layer entry in the GIS database including the binary large object; and associate the layer entry with the layer track.

Example 7 includes the subject matter of any of Examples 1-6, and wherein the binary large object comprises an indication of a remote compute device to implement the one or more methods associated with the binary large object.

Example 8 includes the subject matter of any of Examples 1-7, and wherein the binary large object comprises access control information usable to limit access to the layer entry.

Example 9 includes the subject matter of any of Examples 1-8, and wherein the compute device is a distributed compute device, wherein the GIS database manager circuitry stores information associated with each of the plurality of geo-quads in a node of the compute device in the corresponding geo-quad.

Example 10 includes a method for interacting with a geographic information system (GIS) database, the method comprising receiving, by a compute device, a command to create a layer track associated with a geo-quad of a plurality of geo-quads of the GIS database, wherein the plurality of geo-quads include geo-quads with each of a plurality of different sizes; creating, by the compute device, the layer track in the GIS database; and associating, by the compute device, the layer track with the geo-quad of the plurality of geo-quads.

Example 11 includes the subject matter of Example 10, and further including receiving, by the compute device, a command to create a layer entry associated with the layer track, wherein the command to create the layer entry includes a data object and a start time that is in the future; creating, by the compute device, the layer entry in the GIS database including the data object and the start time that is in the future; and associating, by the compute device, the layer entry with the layer track.

Example 12 includes the subject matter of any of Examples 10 and 11, and wherein the command to create the layer track is a command to create the layer track as a graph database object, wherein creating the layer track in the GIS database comprises creating the layer track in the GIS database as the graph database object, wherein associating the layer track with the geo-quad comprises creating an edge between the layer track and the geo-quad, the method further comprising receiving, by the compute device, a second command to create a second layer track associated with the geo-quad as a relational database object; and creating, by the compute device, the second layer track as the relational database object with an indication of the geo-quad of the plurality of geo-quads stored in the second layer track as a foreign key.

Example 13 includes the subject matter of any of Examples 10-12, and further including receiving, by the compute device, a first query of the layer track; receiving, by the compute device, a second query of the second layer track; traversing, by the compute device, the layer track as a graph in response to receipt of the first query; and performing, by the compute device, one or more join operations on the second layer track in response to receipt of the second query.

Example 14 includes the subject matter of any of Examples 10-13, and further including receiving, by the compute device and from a third party unrelated to an administrator of the GIS database, a command to create a new data layer of the GIS database for use in a new application; and creating, by the compute device and in response to receipt of the command to create the new data layer, the new data layer of the GIS database for use in the new application.

Example 15 includes the subject matter of any of Examples 10-14, and further including receiving, by the compute device, a command to create a layer entry associated with the layer track, wherein the command to create the layer entry includes a binary large object, wherein the binary large object provides an indication of one or more methods associated with the binary large object; creating, by the compute device, the layer entry in the GIS database including the binary large object; and associating, by the compute device, the layer entry with the layer track.

Example 16 includes the subject matter of any of Examples 10-15, and wherein the binary large object comprises an indication of a remote compute device to implement the one or more methods associated with the binary large object.

Example 17 includes the subject matter of any of Examples 10-16, and wherein the binary large object comprises access control information usable to limit access to the layer entry.

Example 18 includes one or more computer-readable media comprising a plurality of instructions stored thereon that, when executed, causes a compute device to perform the method of any of Examples 10-17.

Example 19 includes a compute device for managing a geographic information system (GIS) database, the compute device comprising means for receiving a command to create a layer track associated with a geo-quad of a plurality of geo-quads of the GIS database, wherein the plurality of geo-quads include geo-quads with each of a plurality of different sizes; means for creating the layer track in the GIS database; and means for associating the layer track with the geo-quad of the plurality of geo-quads.

Example 20 includes the subject matter of Example 19, and further including means for receiving a command to create a layer entry associated with the layer track, wherein the command to create the layer entry includes a data object and a start time that is in the future; means for creating the layer entry in the GIS database including the data object and the start time that is in the future; and means for associating the layer entry with the layer track.

Example 21 includes the subject matter of any of Examples 19 and 20, and wherein the command to create the layer track is a command to create the layer track as a graph database object, wherein the means for creating the layer track in the GIS database comprises means for creating the layer track in the GIS database as the graph database object, wherein the means for associating the layer track with the geo-quad comprises means for creating an edge between the layer track and the geo-quad, the compute device further comprising means for receiving a second command to create a second layer track associated with the geo-quad as a relational database object; and means for creating the second layer track as the relational database object with an indication of the geo-quad of the plurality of geo-quads stored in the second layer track as a foreign key.

Example 22 includes the subject matter of any of Examples 19-21, and further including means for receiving a first query of the layer track; means for receiving a second query of the second layer track; means for traversing the layer track as a graph in response to receipt of the first query; and means for performing one or more join operations on the second layer track in response to receipt of the second query.

Example 23 includes the subject matter of any of Examples 19-22, and further including means for receiving, from a third party unrelated to an administrator of the GIS database, a command to create a new data layer of the GIS database for use in a new application; and means for creating, in response to receipt of the command to create the new data layer, the new data layer of the GIS database for use in the new application.

Example 24 includes the subject matter of any of Examples 19-23, and further including means for receiving a command to create a layer entry associated with the layer track, wherein the command to create the layer entry includes a binary large object, wherein the binary large object provides an indication of one or more methods associated with the binary large object; means for creating the layer entry in the GIS database including the binary large object; and means for associating the layer entry with the layer track.

Example 25 includes the subject matter of any of Examples 19-24, and wherein the binary large object comprises an indication of a remote compute device to implement the one or more methods associated with the binary large object.

Example 26 includes the subject matter of any of Examples 19-25, and wherein the binary large object comprises access control information usable to limit access to the layer entry.

The invention claimed is:

1. A compute device for managing a geographic information system (GIS) database, the compute device comprising:
   a processor;
   a memory; and
   GIS database manager circuitry to:
   receive a command to create a layer track associated with a geo-quad of a plurality of geo-quads of the GIS database, wherein the plurality of geo-quads include geo-quads with each of a plurality of different sizes;
   create the layer track in the GIS database; and
   associate the layer track with a corresponding data layer in the GIS database that is associated with the geo-quad of the plurality of geo-quads, the data layer comprising an indication of a content type and the layer track comprising an indication of a category of information associated with the content type indicated in the data layer.

2. The compute device of claim 1, wherein the GIS database manager circuitry is further to:
   receive a command to create a layer entry associated with the layer track, wherein the command to create the layer entry includes a data object and a start time that is in the future;
   create the layer entry in the GIS database including the data object and the start time that is in the future; and
   associate the layer entry with the layer track.

3. The compute device of claim 1, wherein the command to create the layer track is a command to create the layer track as a graph database object,
   wherein to create the layer track in the GIS database comprises to create the layer track in the GIS database as the graph database object,
   wherein to associate the layer track with the geo-quad comprises to create an edge between the layer track and the geo-quad,
   wherein the GIS database manager circuitry is further to:
   receive a second command to create a second layer track associated with the geo-quad as a relational database object; and
   create the second layer track as the relational database object with an indication of the geo-quad of the plurality of geo-quads stored in the second layer track as a foreign key.

4. The compute device of claim 3, wherein the GIS database manager circuitry is further to:
   receive a first query of the layer track;
   receive a second query of the second layer track;
   traverse the layer track as a graph in response to receipt of the first query; and
   perform one or more join operations on the second layer track in response to receipt of the second query.

5. The compute device of claim 1, wherein the GIS database manager circuitry is further to:
   receive, from a third party unrelated to an administrator of the GIS database, a command to create a new data layer of the GIS database for use in a new application; and
   create, in response to receipt of the command to create the new data layer, the new data layer of the GIS database for use in the new application.

6. The compute device of claim 1, wherein the GIS database manager circuitry is further to:
   receive a command to create a layer entry associated with the layer track, wherein the command to create the layer entry includes a binary large object, wherein the binary large object provides an indication of one or more methods associated with the binary large object;
   create the layer entry in the GIS database including the binary large object; and
   associate the layer entry with the layer track.

7. The compute device of claim 6, wherein the binary large object comprises an indication of a remote compute device to implement the one or more methods associated with the binary large object.

8. The compute device of claim 6, wherein the binary large object comprises access control information usable to limit access to the layer entry.

9. The compute device of claim 1, wherein the compute device is a distributed compute device, wherein the GIS database manager circuitry stores information associated with each of the plurality of geo-quads in a node of the compute device in the corresponding geo-quad.

10. A method for interacting with a geographic information system (GIS) database, the method comprising:
    receiving, by a compute device, a command to create a layer track associated with a geo-quad of a plurality of geo-quads of the GIS database, wherein the plurality of geo-quads include geo-quads with each of a plurality of different sizes;
    creating, by the compute device, the layer track in the GIS database; and
    associating, by the compute device, the layer track with a corresponding data layer in the GIS database that is associated with the geo-quad of the plurality of geo-quads, the data layer comprising an indication of a content type and the layer track comprising an indication of a category of information associated with the content type indicated in the data layer.

11. The method of claim 10, further comprising:
receiving, by the compute device, a command to create a layer entry associated with the layer track, wherein the command to create the layer entry includes a data object and a start time that is in the future;
creating, by the compute device, the layer entry in the GIS database including the data object and the start time that is in the future; and
associating, by the compute device, the layer entry with the layer track.

12. The method of claim 10, wherein the command to create the layer track is a command to create the layer track as a graph database object,
wherein creating the layer track in the GIS database comprises creating the layer track in the GIS database as the graph database object,
wherein associating the layer track with the geo-quad comprises creating an edge between the layer track and the geo-quad,
the method further comprising:
receiving, by the compute device, a second command to create a second layer track associated with the geo-quad as a relational database object; and
creating, by the compute device, the second layer track as the relational database object with an indication of the geo-quad of the plurality of geo-quads stored in the second layer track as a foreign key.

13. The method of claim 12, further comprising:
receiving, by the compute device, a first query of the layer track;
receiving, by the compute device, a second query of the second layer track;
traversing, by the compute device, the layer track as a graph in response to receipt of the first query; and
performing, by the compute device, one or more join operations on the second layer track in response to receipt of the second query.

14. The method of claim 10, further comprising:
receiving, by the compute device and from a third party unrelated to an administrator of the GIS database, a command to create a new data layer of the GIS database for use in a new application; and
creating, by the compute device and in response to receipt of the command to create the new data layer, the new data layer of the GIS database for use in the new application.

15. The method of claim 10, further comprising:
receiving, by the compute device, a command to create a layer entry associated with the layer track, wherein the command to create the layer entry includes a binary large object, wherein the binary large object provides an indication of one or more methods associated with the binary large object;
creating, by the compute device, the layer entry in the GIS database including the binary large object; and
associating, by the compute device, the layer entry with the layer track.

16. The method of claim 15, wherein the binary large object comprises an indication of a remote compute device to implement the one or more methods associated with the binary large object.

17. The method of claim 15, wherein the binary large object comprises access control information usable to limit access to the layer entry.

18. One or more computer-readable media comprising a plurality of instructions stored thereon that, when executed, causes a compute device to:
receive a command to create a layer track associated with a geo-quad of a plurality of geo-quads of the GIS database, wherein the plurality of geo-quads include geo-quads with each of a plurality of different sizes;
create the layer track in the GIS database; and
associate the layer track with a corresponding data layer in the GIS database that is associated with the geo-quad of the plurality of geo-quads, the data layer comprising an indication of a content type and the layer track comprising an indication of a category of information associated with the content type indicated in the data layer.

19. The one or more computer-readable media of claim 18, wherein the plurality of instructions further cause the compute device to:
receive a command to create a layer entry associated with the layer track, wherein the command to create the layer entry includes a data object and a start time that is in the future;
create the layer entry in the GIS database including the data object and the start time that is in the future; and
associate the layer entry with the layer track.

20. The one or more computer-readable media of claim 18, wherein the command to create the layer track is a command to create the layer track as a graph database object,
wherein to create the layer track in the GIS database comprises to create the layer track in the GIS database as the graph database object,
wherein to associate the layer track with the geo-quad comprises to create an edge between the layer track and the geo-quad,
wherein the plurality of instructions further cause the compute device to:
receive a second command to create a second layer track associated with the geo-quad as a relational database object; and
create the second layer track as the relational database object with an indication of the geo-quad of the plurality of geo-quads stored in the second layer track as a foreign key.

21. The one or more computer-readable media of claim 20, wherein the plurality of instructions further cause the compute device to:
receive a first query of the layer track;
receive a second query of the second layer track;
traverse the layer track as a graph in response to receipt of the first query; and
perform one or more join operations on the second layer track in response to receipt of the second query.

22. The one or more computer-readable media of claim 18, wherein the plurality of instructions further cause the compute device to:
receive, from a third party unrelated to an administrator of the GIS database, a command to create a new data layer of the GIS database for use in a new application; and
create, in response to receipt of the command to create the new data layer, the new data layer of the GIS database for use in the new application.

23. The one or more computer-readable media of claim 18, wherein the plurality of instructions further cause the compute device to:
receive a command to create a layer entry associated with the layer track, wherein the command to create the layer entry includes a binary large object, wherein the binary large object provides an indication of one or more methods associated with the binary large object;

create the layer entry in the GIS database including the binary large object; and associate the layer entry with the layer track.

24. The one or more computer-readable media of claim 23, wherein the binary large object comprises an indication of a remote compute device to implement the one or more methods associated with the binary large object.

25. The one or more computer-readable media of claim 23, wherein the binary large object comprises access control information usable to limit access to the layer entry.

* * * * *